United States Patent Office 3,314,956
Patented Apr. 18, 1967

3,314,956
1,3,9-TRIAZASPIRO[5.5]UNDECA-1,3-DIENE-CARBONITRILES
Milton Wolf, West Chester, and Albert A. Mascitti, Norristown, Pa., assignors to American Home Products Corporation, New York, N.Y., a corporation of Delaware
No Drawing. Filed Sept. 22, 1965, Ser. No. 489,427
17 Claims. (Cl. 260—256.4)

This invention relates to new and useful 1,3,9-triazaspiro[5.5]undeca-1,3-diene-5-carbonitriles as well as to the novel method for their preparation. In particular, the present invention is concerned with 2-amino-4-hydroxy - 9 - substituted-1,3,9-triazaspiro[5.5]undeca-1,3-diene-5-carbonitriles and 2,4-diamino-9-substituted-1,3,9-triazaspiro[5.5]undeca - 1,3-diene-5-carbonitriles having pharmacodynamic activity.

The novel compounds which are included within the purview of this invention are selected from the group having the formula:

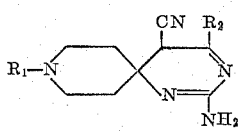

wherein $R_1$ is selected from the group consisting of hydrogen, lower alkyl, phen(lower)alkyl, phenyl, lower alkylphenyl, lower alkoxyphenyl, halophenyl and di(lower)alkylamino(lower)alkyl; $R_2$ is selected from the group consisting of amino and hydroxy; and the pharmaceutically acceptable acid addition salts thereof. Examples of such compounds include 2-amino-4-hydroxy-9-phenethyl-1,3,9-triazaspiro[5.5]undeca - 1,3 - diene-5-carbonitrile; 2-amino-4-hydroxy - 9 - methyl-1,3,9-triazaspiro[5.5]undeca-1,3-diene - 5 - carbonitrile and 2,4-diamino-9-phenethyl-1,3,9-triazaspiro[5.5]undeca - 1,3 - diene-5-carbonitrile.

In accord with the process of the present invention the compounds of this invention may be prepared by the reaction of a cyanoacetate or a malononitrile of the formulae:

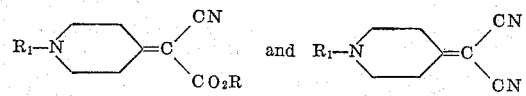

or their acid salts, where $R_1$ is defined as above and R is lower alkyl, with an acid salt of a guanidine in an alkaline organic solvent at a temperature that is in the range from about 30° C. to about 100° C. for a period from about four to about forty-eight hours. Preferably this reaction is conducted in the presence of sodium dissolved in absolute ethanol at the reflux temperature of the reaction mixture for a period of twenty to thirty hours. By organic solvent as employed herein is meant an organic solvent which dissolves the reactants and will not prevent or interfere with their interaction. The majority of the reactants employed in the process of this invention are known compounds which are readily available from commercial sources, while the remainder can easily be prepared in accordance with standard organic procedures well known to those skilled in the art. The acid salts of the cyanoacetatic malononitriles and guanidine reactants are exemplified and include those of hydrochloric acid, hydrobromic acid, sulfuric acid, nitric acid, phosphoric acid, acetic acid, benzenesulfonic acid and toluenesulfonic acid.

After the reaction is complete, the reaction mixture is cooled, filtered and the product is obtained by conventional methods such as extraction, concentration and crystallization.

In accord with the above described process, the reactants listed in Table I are reacted with a guanidine acid salt to produce the corresponding products:

Table I

| Reactants | Product |
|---|---|
| An alkyl(1-substituted-4-piperidylidene)cyanoacetate acid salt. | A 2-amino-4-hydroxy-9-substituted-1,3,9-triazaspiro[5.5]undeca-1,3-diene-5-carbonitrile. |
| A (1-substituted-4-piperidylidene)malononitrile acid salt. | A 2,4-amino-9-substituted-1,3,9-triazaspiro[5.5]undeca-1,3-diene-5-carbonitrile. |

Since many of the compounds of the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaceutically-acceptable acids should be employed in therapeutic applications. Particularly effective salts are those formed with pharmaceutically acceptable acids having a pK value of 3 or lower. Such acids are well known in the art, for example, hydrochloric, hydrobromic, sulfuric, nitric, phosphoric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

In accord with the present invention, the aforementioned 1,3,9-triazaspiro[5.5]undeca-1,3-diene-5-carbonitriles have been found to possess interesting pharmaceutical properties which render them useful as synthetic medicinals. More particularly, these compounds have exhibited utility as diuretics and anti-Parkinsonism agents.

When the compounds of this invention are employed as diuretics and anti-Parkinsonism agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1 mg. to about 50 mg. per kilo of body weight per day, although as aforementioned variations will occur. However, a dosage level that is in the range of from about 10 mg. to about 25 mg. per kg. of body weight per day is most desirably employed in order to achieve effective results.

The following examples are given by way of illustration and are not to be construed as limitations of this invention, many variations of which are possible without departing from the scope.

*Example I*

A mixture of ethyl-(1-β-plenethyl-4-piperidylidene) cyanoacetate hydrochloride (16 g., 0.050 m.) and guanidine hydrochloride (5.0 g., 0.050 m.) in absolute ehtanol (500 cc.) containing sodium ethoxide (0.010 m.) (freshly prepared in situ from 2.3 g. (0.1 g.-atom) of sodium was refluxed for twenty-four hours). After cooling the insoluble material was separated by filtration, triturated with water, then acetone, and dried at 140° C./0.1 mm. The yield of 2-amino-4-hydroxy-9-phenethyle - 1,3,9, - triazaspiro[5.5]undeca - 1,3, - diene-5-carbonitrile, as a colorless solid, is 8.0 g. (51.4 percent) m.p. 254–5° C. (uncorr.).

Anal. Calc'd for $C_{17}H_{21}N_5O$: C, 65.56; H, 6.79; N, 22.49. Found: C, 65.45; H, 6.83; N, 22.46.

In a similar manner, 2-amino-4-hydroxy-9-benzyl-1,3,9,triazaspiro[5.5]undeca - 1,3 - diene - 5 - carbinitrile and 2 - amino - 4 - hydroxy - 9 - phenbutyl - 1,3,9,triazaspiro[5.5]undeca - 1,3 - diene - 5 - carbonitrile are produced.

*Example II*

A mixture of ethyl - (1 - methyl - 4 - piperidylidene) cyano - acetate hydrochloride (12.2 g., 0.50 m.) and guanidine hydrochloride (4.7 g., 0.049 m.) in absolute ethanol (300 cc.) containing sodium ethoxide (0.10 m.) is refluxed for 24 hours. The insoluble material is separated by filtration and washed with hot water, then hot ethanol, and air-dried. The yield of 2-amino-4-hydroxy - 9 - methyl - 1,3,9, - triazaspiro[5.5]undeca - 1,3,-diene-5-carbonitrile, as a colorless solid, is 6.0 g. (54.0 percent), m.p. 266–7° C. dec. (uncorr.).

Anal. Calc'd for $C_{10}H_{15}N_5O.5H_2O$: C, 52.16; H, 6.93; N, 30.42; $H_2O$, 3.4. Found: C, 52.24; H, 6.81; N, 30.51; $H_2O$, 3.8.

Similarly, 2 - amino - 4 - hydroxy - 9 - butyl - 1,3,9 - triazaspiro[5.5]undeca - 1,3 - diene - 5 - carbonitrile is synthesized.

*Example III*

The procedure described in the foregoing examples is repeated reacting the acid salts of guanidine and a 4-piperidylidene cyanoacetate and the following corresponding products are obtained:

2-amino-4-hydroxy-9-phenyl-1,3,9-triazaspiro[5.5] undeca-1,3,-diene-5-carbonitrile;
2-amino-4-hydroxy-9-(m-tolyl)-1,3,9-triazaspiro[5.5] undeca-1,3,-diene-5-carbonitrile;
2-amino-4-hydroxy-9-(p-propylphenyl)-1,3,9,-triazaspiro[5.5]undeca-1,3,-diene-5-carbonitrile;
2-amino-4-hydroxy-9-(o-methoxyphenyl)-1,3,9-triazaspiro[5.5]undeca-1,3,-diene-5-carbonitrile;
2-amino-4-hydroxy-9-(p-chloropheny)-1,3,9-triazaspiro[5.5]undeca-1,3-diene-5-carbonitrile;
2-amino-4-hydroxy-9-(m-fluorophenyl)-1,3,9,-triazaspiro[5.5]undeca-1,3,-diene-5-carbonitrile;
2-amino-4-hydroxy-9-dimethylaminoethyl-1,3,9-triazaspiro[5.5]undeca-1,3-diene-5-carbonitrile;
2-amino-4-hydroxy-9-dibutylaminopropyl-1,3,9-triazaspiro[5.5]undeca-1,3-diene-5-carbonitrile.

*Example IV*

A mixture of methyl - (1 - ethyl - 4 - piperidylidene) cyanoacetate hydrobromide (12.5 g.) and guanidine hydrobromide (4.7 g.) in absolute ethanol (300 cc.) containing sodium ethoxide (0.10 m.) is refluxed for 40 hours. The insoluble product is separated by filtration and admixed for 30 minutes, with stirring with 0.5 N hydrochloric acid (100 cc.). Thereafter, the solvent is removed under vacuum and the residue is 2-amino-4-hydroxy - 9 - ethyl - 1,3,9 - triazaspiro[5.5]undeca -1,3 - diene-5-carbonitrile hydrochloride.

Other acid salts of the 2-amino-4-hydroxy-1,3,9-triazaspiro[5.5]undeca - 1,3 - diene - 5 - carbonitrile compounds of the present invention described in the prior examples are prepared by this same procedure employing sulfuric acid, phosphoric acid, hydrobromic acid, nitric acid, benzenesulfonic acid and toluenesulfonic acid.

*Example V*

A mixture of (1-methyl-4-piperidylidene)malononitrile hydrochloride (6.5 g., 0.20 m.) and guanidine hydrochloride (2.0 g., 0.021 m.) in absolute ethanol (350 cc.) containing sodium ethoxide (2.72 g., 0.040 m.) is refluxed for twenty-four hours. After cooling, the inorganic salt is separated by filtration, and the filtrate concentrated in vacuo to dryness. The dark brown, amorphous residue is recrystallized from absolute ethanol (Darco G 60) yielding 1.3 g. of 2,4-diamino-9-phenethyl - 1,3,9 - triazaspiro[5.5]undeca - 1,3 - diene - 5 - carbonitrile, m.p. 215–17° C. (uncorr.) after drying at 140° C./0.1 mm.

Anal. Cal'd for $C_{17}H_{22}N_6C_2H_5OH$: C, 64.01; H, 7.92. Found: C, 64.46; H, 7.51.

*Example VI*

When the procedure of Example V is employed, reacting the hereinafter listed acid salts of guanidine and a 4-piperidylidene malonoitrile, the following products are obtained:

| Starting Compounds | Product |
|---|---|
| (1-pentyl-4-piperidylidene)malononitrile HCl and guanidine HCl. | 2,4-diamino-9-pentyl-1,3,9-triazaspiro[5.5]undeca-1,3-diene-5-carbonitrile. |
| (1-isopropyl-4-piperidylidene)malononitrile HBr and guanidine HBr. | 2,4-diamino-9-isopropyl-1,3,9-triazaspiro[5.5]undeca-1,3-diene-5-carbonitrile. |
| (1-heptylphenyl-4-piperidylidene)-malononitrile $HNO_3$ and guanidine acetate. | 2,4-diamino-9-heptylphenyl-1,3,9-triazaspiro[5.5]undeca-1,3-diene-5-carbonitrile. |
| (1-ethoxyphenyl-4-piperylidene)-malononitrile HCl and guanidinesulfate. | 2,4-diamino-9-ethoxyphenyl-1,3,9-triazaspiro[5.5]undeca-1,3-diene-5-carbonitrile. |
| (1-butoxyphenyl-4-piperidylidene)-malononitrile benzenesulfonate and guanidine nitrate. | 2,4-diamino-9-butoxyphenyl-1,3,9-triazaspiro[5.5]undeca-1,3-diene-5-carbonitrile. |
| (1-methyl-4-piperidylidene)malononitrile $H_3PO_4$ and guanidine phosphate. | 2,4-ndiamio-9-methyl-1,3,9-triazaspiro[5.5]undeca-1,3-diene-5-carbonitrile. |
| (1-ethyl-4-piperidylidene)malononitrile HCl and guanidine HCl. | 2,4-diamino-9-ethyl-1,3,9-triazaspiro[5.5]undeca-1,3-diene-5-carbonitrile. |

*Example VII*

To 700 cc. of absolute ethanol there is added 13.0 g. of (1-phenyl-4-piperidylidene)malononitrile hydrobromide, 2.0 g. of sodium, and 4.0 g. of guanidine hydrochloride and the mixture is refluxed for 48 hours. After cooling, the inorganic salt is separated by filtration, and the filtrate concentrated in vacuo to dryness. The residue is recrystallized from absolute ethanol, to yield 2,4-diamino-9 - phenyl - 1,3,9 - triazaspiro[5.5]undeca - 1,3 - diene - 5-carbonitrile.

In a similar manner, 2,4-diamino-9-(p-bromophenyl)-1,3,9 - triazaspiro[5.5]undeca - 1,3 - diene - 5 - carbonitrile; 2,4 - diamino - 9 - (p - iodophenyl) - 1,3,9 - triazaspiro[5.5]undeca - 1,3 - diene - 5 - carbonitrile and 2,4-diamino - 9 - (p - tolyl) - 1,3,9 - triazapiro[5.5]undeca-1,3-diene-5-carbonitrile are synthesized.

Example VIII

A mixture of 1 - diethylaminoethyl - 4 - piperidylidene malononitrile hydrochloride (6.8 g.) and guanidine sulfate (2.0 g.) in absolute ethanol (350 cc.) containing sodium ethoxide (2.7 g.) is refluxed for 8 hours. After cooling, the inorganic salt is separated by filtration, and the filtrate concentrated to dryness. The residue is recrystallized from absolute ethanol and, in this manner, 2,4 - diamino - 9 - diethylaminoethyl - 1,3,9 - triazaspiro [5.5]undeca-1,3-diene-5-carbonitrile is obtained.

In a similar manner, 2,4-diamino-9-dimethylaminohexyl - 1,3,9 - triazaspiro[5.5]undeca - 1,3 - diene - 5 - carbonitrile is produced.

Example IX

The hydrochloride salt of 2,4-diamino-9-diethylaminoethyl - 1,3,9 - triazaspiro[5.5]undeca - 1,3 - diene - 5 - carbonitrile is prepared by admixing the compound with an aqueous solution containing an equivalent amount of hydrochloric acid and, thereafter, evaporating the aqueous solvent under vacuum.

Other acid addition salts of the new 2,4-diamino-1,3,9-triazaspiro[5.5]undeca - 1,3 - diene - 5 - carbonitriles of the present invention described in the above examples are prepared by the same procedure employing hydrobromic acid, hydroiodic acid, nitric acid, sulfuric acid, and phosphoric acid.

What is claimed is:
1. A compound selected from the group consisting of those having the formula:

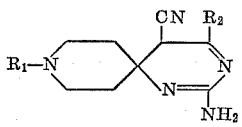

wherein $R_1$ is selected from the group consisting of hydrogen, lower alkyl, phen(lower)alkyl, phenyl, lower alkylphenyl, lower alkoxyphenyl, halophenyl and di(lower) alkylamino(lower)alkyl; $R_2$ is selected from the group consisting of amino and hydroxy; and the pharmaceutically acceptable acid addition salts thereof.

2. 2-amino-4-hydroxy-9-phenethyl-1,3,9-triazaspiro [5.5]undeca-1,3-diene-5-carbonitrile.
3. 2-amino-4-hydroxy-9-dimethylaminoethyl-1,3,9-triazaspiro[5.5]undeca-1,3-diene-5-carbonitrile.
4. 2,4-diamino-9-phenethyl1-,3,9-triazaspiro[5.5]undeca-1,3-diene-5-carbonitrile.
5. 2,4-diamino-9-phenyl-1,3,9-triazaspiro[5.5]undeca-1,3-diene-5-carbonitrile.
6. 2,4-diamino-9-(p-tolyl)-1,3,9-triazaspiro[5.5]undeca-1,3-diene-5-carbonitrile.
7. a 2-amino-4-hydroxy-9-(lower)alkyl-1,3,9-triazaspiro[5.5]undeca-1,3-diene-5-carbonitrile.
8. 2-amino-4-hydroxy-9-methyl-1,3,9-triazaspiro[5.5] undeca-1,3-diene-5-carbonitrile.
9. 2-amino-4-hydroxy-9-ethyl-1,3,9-triazaspiro[5.5] undeca-1,3-diene-5-carbonitrile.
10. 2-amino-4-hydroxy-9-butyl-1,3,9-triazaspiro[5.5] undeca-1,3-diene-5-carbonitrile.
11. a 2,4-diamino-9(lower)alkyl-1,3,9-triazaspiro[5.5] undeca-1,3-diene-5-carbonitrile.
12. 2,4-diamino-9-methyl-1,3,9-triazaspiro[5.5]undeca-1,3-diene-5-carbonitrile.
13. 2,4-diamino-9-ethyl-1,3,9-triazaspiro[5.5]undeca-1,3-diene-5-carbonitrile.
14. 2,4-diamino-9-isopropyl-1,3,9-triazaspiro[5.5]undeca-1,3-diene-5-carbonitrile.
15. A process for the production of a compound of the formula:

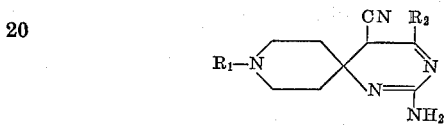

wherein $R_1$ is selected from the group consisting of hydrogen, lower alkyl, phen(lower)alkyl, phenyl, lower alkylphenyl, lower alkoxyphenyl, halophenyl and di(lower) alkylamino(lower) alkyl; and $R_2$ is selected from the group consisting of amino and hydroxy, which comprises contacting a compound selected from the group consisting of the formulae:

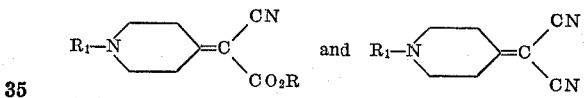

and their acid salts, where $R_1$ is defined above and R is lower alkyl, with an acid salt of guanidine in an alkaline organic solvent at a temperature that is in the range from about 30° C. to about 100° C. for a period of from about four to about forty-eight hours.

16. A process as claimed in claim 15 wherein the organic solvent is ethanol.
17. A process as claimed in claim 16 wherein the reaction is conducted at the reflux temperature of the reaction mixture and in the presence of sodium ethoxide.

References Cited by the Examiner

Brown: The Pyrimidine, Interscience Publishers, New York, 1962, pp. 71–74.

ALEX MAZEL, *Primary Examiner.*

MARY U. O'BRIEN, *Assistant Examiner.*